(12) United States Patent
Han et al.

(10) Patent No.: US 11,047,698 B2
(45) Date of Patent: Jun. 29, 2021

(54) AUTONOMOUS DRIVING APPARATUS AND METHOD THEREOF

(71) Applicant: SAMSUNG ELECTRONICS CO., LTD., Suwon-si (KR)

(72) Inventors: Seongwon Han, Suwon-si (KR); Daehyun Ban, Suwon-si (KR); Woojin Park, Suwon-si (KR); Seowoo Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 222 days.

(21) Appl. No.: 16/285,717

(22) Filed: Feb. 26, 2019

(65) Prior Publication Data

US 2019/0265060 A1    Aug. 29, 2019

(30) Foreign Application Priority Data

Feb. 27, 2018    (KR) .................. 10-2018-0023813

(51) Int. Cl.
*G01C 21/34* (2006.01)
*G05D 1/02* (2020.01)
*G06N 20/00* (2019.01)
*G05D 1/00* (2006.01)

(52) U.S. Cl.
CPC ..... *G01C 21/3484* (2013.01); *G01C 21/3492* (2013.01); *G05D 1/0088* (2013.01); *G05D 1/0221* (2013.01); *G06N 20/00* (2019.01); *G05D 2201/0213* (2013.01)

(58) Field of Classification Search
CPC ............ G01C 21/3484; G01C 21/3492; G01C 21/3407; G05D 1/0221; G05D 1/0088; G05D 2201/0213; G06N 20/00
See application file for complete search history.

(56) References Cited

U.S. PATENT DOCUMENTS

| | | | |
|---|---|---|---|
| 6,622,087 B2 * | 9/2003 | Anderson | G01C 21/3484 701/117 |
| 9,195,914 B2 | 11/2015 | Fairfield et al. | |
| 2005/0102098 A1 * | 5/2005 | Montealegre | G01C 21/32 701/533 |

(Continued)

FOREIGN PATENT DOCUMENTS

| | | |
|---|---|---|
| JP | 2017-062212 | 3/2017 |
| KR | 10-0920017 | 10/2009 |

(Continued)

OTHER PUBLICATIONS

International Search Report and Written Opinion dated Jun. 11, 2019, issued in International Application No. PCT/KR2019/002353.

(Continued)

*Primary Examiner* — Michael J Zanelli

(74) *Attorney, Agent, or Firm* — Nixon & Vanderhye, P.C.

(57) ABSTRACT

A method for controlling an autonomous driving apparatus of a vehicle includes receiving a destination for setting a route, obtaining driving history of a user and traffic information, determining a driving route to the destination based on information on the destination, information on the driving history, and the traffic information provided to a model trained through an artificial intelligence algorithm as input data, and performing autonomous driving along the determined driving route.

16 Claims, 17 Drawing Sheets

(56) References Cited

U.S. PATENT DOCUMENTS

| | | | |
|---|---|---|---|
| 2009/0192705 A1 | 7/2009 | Golding et al. | |
| 2010/0106414 A1 | 4/2010 | Whitehead | |
| 2013/0231824 A1 | 9/2013 | Wilson et al. | |
| 2014/0005922 A1 | 1/2014 | Bank et al. | |
| 2016/0026182 A1 | 1/2016 | Boroditsky et al. | |
| 2017/0068245 A1* | 3/2017 | Scofield | G06Q 20/102 |
| 2017/0192437 A1 | 7/2017 | Bier et al. | |
| 2017/0219368 A1 | 8/2017 | Meredith et al. | |
| 2017/0370732 A1 | 12/2017 | Bender et al. | |
| 2019/0025842 A1* | 1/2019 | Kim | G05D 1/0061 |
| 2019/0187705 A1* | 6/2019 | Ganguli | B60W 30/12 |

FOREIGN PATENT DOCUMENTS

| | | |
|---|---|---|
| KR | 10-2015-0066303 | 6/2015 |
| KR | 10-1704634 | 2/2017 |
| WO | 2016/037090 | 3/2016 |

OTHER PUBLICATIONS

Extended Search Report dated Dec. 3, 2020 in counterpart European Patent Application No. 19760121.4.

\* cited by examiner

FIG. 4B

DRIVING ROUTE 1 : TEHERANRO→GANGNAMDAERO
→GANGNAMDAERO 55 GIL
DRIVING ROUTE 2 : TEHERANRO→SEOCHODAERO
→SEOCHODAERO 74 GIL

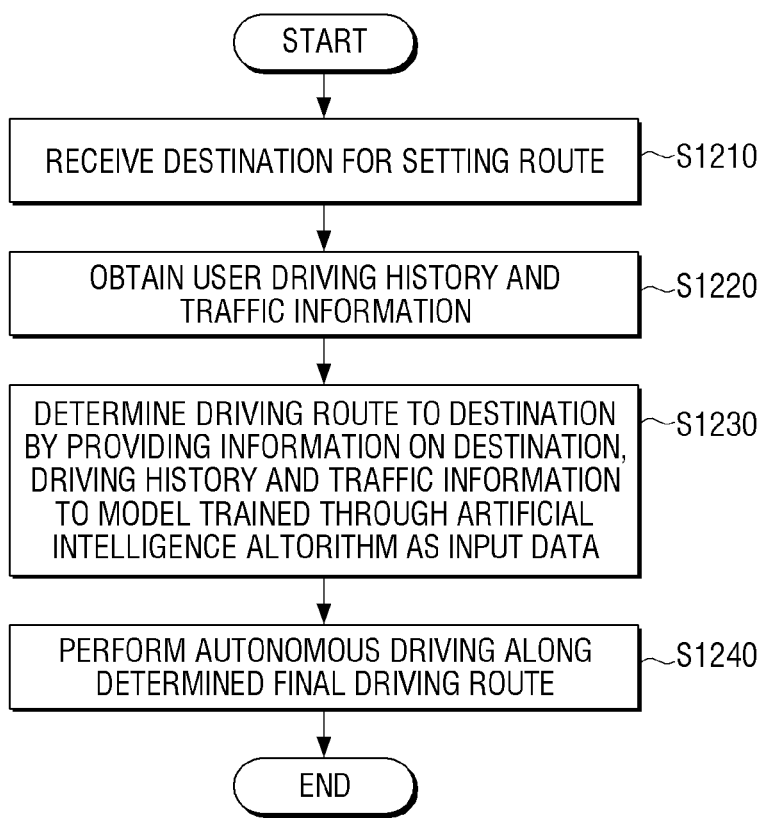

AUTONOMOUS DRIVING APPARATUS AND METHOD THEREOF

CROSS-REFERENCE TO RELATED APPLICATION

This application is based on and claims priority under 35 U.S.C. § 119 to Korean Patent Application No. 10-2018-0023813, filed on Feb. 27, 2018, in the Korean Intellectual Property Office, the disclosure of which is incorporated by reference herein in its entirety.

BACKGROUND

1. Field

The disclosure relates to an autonomous driving apparatus and a controlling method thereof, and, for example, to a method for setting an optimal driving route based on various information such as destination information, traffic information, road information, user driving history, etc. and a method for driving a vehicle depending on a driving habit of a user.

The present disclosure also relates to an artificial intelligence (AI) system that simulates functions, such as recognition and judgment, of a human brain using a machine learning algorithm and its application.

2. Description of Related Art

An artificial intelligence (AI) system may refer to a system which implements human-level intelligence, in which the machine trains itself, judges and becomes smart, unlike a conventional rule-based smart system. The more the artificial intelligence system is used, the higher the recognition rate and the better understanding of user preference. Therefore, the conventional rule-based smart system is replaced with a deep-learning based artificial intelligence system.

The artificial intelligence technology includes machine learning (e.g., deep-learning) and element technologies that use the machine learning.

Machine learning may refer to an algorithm technology that classifies/trains the characteristics of input data by itself. The element technology may refer to a technology that uses a machine learning algorithm such as deep-learning and includes linguistic understanding, visual understanding, reasoning/prediction, knowledge representation, motion control, etc.

The artificial intelligence technology may be applied to various fields, examples of which are described below. Linguistic understanding may refer to a technology for recognizing and applying/processing human language/characters, including natural language processing, machine translation, dialogue system, query response, speech recognition/synthesis, and the like. Visual comprehension may refer to a technology for recognizing and processing an object as if it was perceived by human being, including object recognition, object tracking, image search, human recognition, scene understanding, spatial understanding, image enhancement, etc. Inference prediction may refer to a technology for judging, logically inferring and predicting information, including knowledge/probability based reasoning, optimization prediction, preference base planning, and recommendation. Knowledge representation may refer to a technology for automating human experience information into knowledge data, including knowledge building (data generation/classification) and knowledge management (data utilization). The motion control may refer to a technology for controlling the autonomous travel of a vehicle and the motion of a robot, including motion control (navigation, crash and traveling), operation control (behavior control), and the like.

Recently, various autonomous driving algorithms exist for usability. An autonomous driving apparatus to which the above-described autonomous driving algorithm is applied determines an optimal route from departure to destination, and drives a vehicle along the determined optimal route. For example, a conventional autonomous driving apparatus may not consider a driving route easy for a user, but may drive an optimally determined driving route. However, there is a problem that the above-described autonomous driving algorithm may not reflect a driving route preferred by a user.

SUMMARY

An aspect of the example embodiments relates to an autonomous driving apparatus reflecting a user-preferred path and a driving habit of a user, and a controlling method thereof.

According to an example embodiment, a method for controlling an autonomous driving apparatus of a vehicle is provided, the method including receiving a destination for setting a route, obtaining a driving history of a user and traffic information, determining a driving route to the destination based on information on the destination, the driving history, and the traffic information provided to a model trained through an artificial intelligence algorithm as input data, and performing autonomous driving along the determined driving route.

Based on a user command for changing a driving route being input while the vehicle drives along the determined driving route, determining a new driving route based on information on a driving route change corresponding to the user command, the information on the destination, information on the driving history, and the traffic information provided to the trained model.

The method may further include based on a driving route being changed based on the user command, updating the driving history of the user based on information on the changed driving route.

The determining may include obtaining at least one first driving route to the destination based on the destination information and the traffic information provided to a trained first model, obtaining a second driving route based on the destination information and the driving history of the user provided to a trained second model, and determining a driving route to the destination based on one of the at least one first driving route and the second driving route.

The method may further include displaying a UI including a message that the determined driving route is not preferred by the user based on the determined driving route not being the second driving route.

The method may further include displaying a UI including information on the first driving route and the second driving route, and determining one of the first driving route and the second driving route as a driving route to the destination based on a user input received through the UI.

The first driving route may be one of a minimum time driving route, a shortest distance driving route, and a least cost driving route from departure to destination, and wherein the second driving route is a driving route preferred by the user.

The driving history may further include a preferred route of the user, a non-preferred route of the user, driving speed information of the vehicle, and lane change information.

The method may further include obtaining a driving habit of the user based on the driving history of the user provided to the model trained through the artificial intelligence algorithm, wherein the performing comprises performing autonomous driving based on the obtained driving habit.

According to an example embodiment, an autonomous driving apparatus of a vehicle is provided, the autonomous driving apparatus including a communicator comprising communication circuitry, a memory configured to store a driving history of a user, and a processor configured to receive destination information and traffic information for setting a route through the communicator, to determine a driving route to a destination based on the destination information, driving history, and the traffic information provided to a model trained through an artificial intelligence algorithm as input data, and to perform autonomous driving along the determined driving route.

The processor may be further configured to, based on a user command for changing a driving route being input while the vehicle drives along the determined driving route, determine a new driving route based on information on a driving route change corresponding to the user command, the destination information, the driving history, and the traffic information provided to the trained model.

The processor may be further configured to, based on a driving route being changed according to the user command, update the driving history of the user based on information on the changed driving route, and store the updated driving history in the memory.

The processor may be further configured to obtain at least one first driving route to the destination based on the destination information and the traffic information provided to a trained first model, to obtain a second driving route based on the destination information and the driving history of the user provided to a trained second model, and to determine a driving route to the destination based on one of the at least one first driving route and the second driving route.

The apparatus may further include a display, wherein the processor is further configured to, based on the determined driving route not being the second driving route, control the display to display a UI including a message that the determined driving route is not preferred by the user.

The apparatus may further include a display, wherein the processor is further configured to control the display to display a UI including information on the first driving route and the second driving route and determine one of the first driving route and the second driving route as the driving route to the destination based on a user input received through the UI.

The first driving route may be one of a minimum time driving route, a shortest distance driving route, and a least cost driving route from departure to destination, and wherein the second driving route is a driving route preferred by the user.

The driving history may further include a preferred route of the user, a non-preferred route of the user, driving speed information of the vehicle, and lane change information.

The processor may be further configured to obtain a driving habit of the user based on the driving history of the user provided to the model trained through the artificial intelligence algorithm, and to perform autonomous driving based on the obtained driving habit.

According to the above-described various example embodiments, an autonomous driving apparatus trains a driving route preferred by a user and a driving habit of the user thereby to provide a driving route desired by the user.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 4B is a diagram illustrating an example driving route setting method according to an embodiment of the present disclosure;

FIG. 12 is a flowchart illustrating an example method for controlling an autonomous driving apparatus according to an embodiment of the present disclosure.

DETAILED DESCRIPTION

Figure 1:
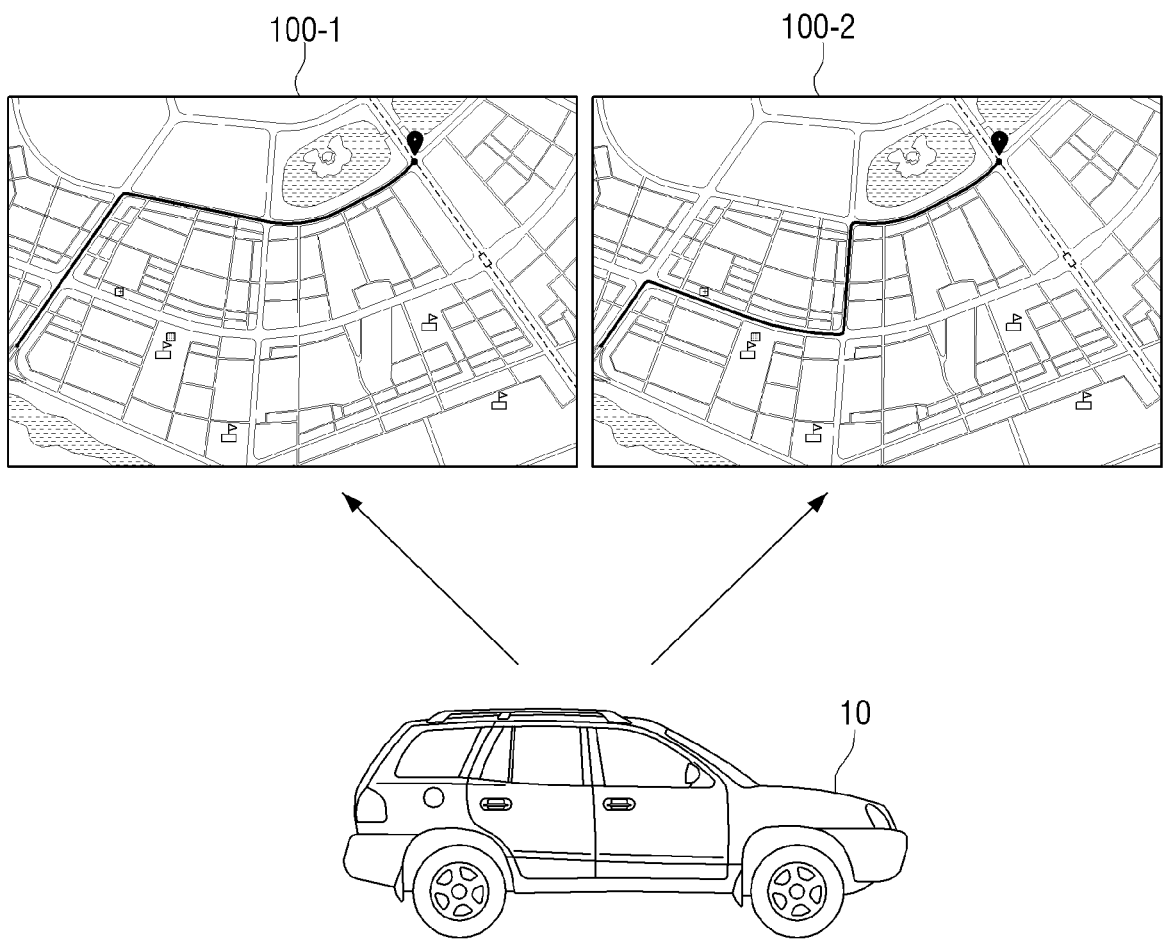
FIG. 1 is a diagram illustrating an example method for setting a route of a vehicle according to an embodiment of the present disclosure.

The terms used in this disclosure will be briefly described, and the present disclosure will be described in greater detail below.

The terms used in this disclosure including technical and scientific terms have the same meanings as would be generally understood by those skilled in the related art. However, these terms may vary depending on the intentions of the person skilled in the art, legal or technical interpretation, and the emergence of new technologies. In addition, some terms may be arbitrarily selected. These terms may be understood based on the meaning defined herein and, unless otherwise specified, may be understood based on the entire contents of this disclosure and common technical knowledge in the art.

The disclosure is not limited to any particular example embodiment disclosed below and may be implemented in various forms and the scope of the disclosure is not limited to the following example embodiments. In addition, all changes or modifications derived from the meaning and scope of the claims and their equivalents should be understood as being included within the scope of the present disclosure. In the following description, the configuration which is publicly known but irrelevant to the gist of the present disclosure may be omitted.

The terms such as "first," "second," and so on may be used to describe a variety of elements, but the elements should not be limited by these terms. The terms are used simply to distinguish one element from other elements.

The singular expression also includes the plural meaning so long as it does not conflict with the context. In this disclosure, terms such as 'include' and 'have/has' should be understood as designating that there are such features, numbers, operations, elements, components and/or any combination thereof in the disclosure, not to exclude the existence or possibility of adding one or more of other features, numbers, operations, elements, components or a combination thereof.

In an example embodiment, 'a module', 'a unit', or 'a part' perform at least one function or operation, and may be realized, for example, and without limitation, as hardware, such as a processor, integrated circuit, or the like, software that is executed by a processor, or any combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

Hereinafter, various example embodiments of the present disclosure will be described in greater detail with reference to the accompanying drawings. However, the present disclosure may be embodied in many different forms and is not limited to the example embodiments described herein. In order to clearly illustrate the present disclosure in the drawings, some of the elements that are not essential to the complete understanding of the disclosure may be omitted for clarity, and like reference numerals refer to like elements throughout the disclosure.

Meanwhile, according to the present disclosure, an autonomous driving apparatus may refer, for example, to an apparatus capable of automatically driving. The autonomous driving apparatus may be embodied as a vehicle, but is not limited thereto. The present disclosure may be embodied as various means of transportation such as, for example, and without limitation, a two-wheeled vehicle, a robot, a flight vehicle, and the like, or an additional electronic device for controlling a vehicle, a robot, a flight vehicle, or the like. For ease of explanation, it will be assumed that the autonomous driving apparatus is embodied as a separate autonomous electronic device capable of controlling the vehicle.

FIG. 1 is a diagram illustrating an example method for setting a route of a vehicle according to an embodiment of the present disclosure.

Referring to FIG. 1, a vehicle 10 may obtain a driving route from departure to destination by obtaining departure and destination information. For example, an autonomous driving apparatus 100 (e.g., referring to FIGS. 2 and 3) included in the vehicle 10 may determine a driving route to destination based on various information such as, for example, and without limitation, destination information, user driving history, traffic information, pre-stored map information, state information of the vehicle 10, state information of the surroundings of the vehicle 10, or the like. The driving history of the user may refer, for example, to all information when the vehicle 10 is directly driven by a user, and may not include information in a vehicle's autonomous driving state. For example, the driving history may include various information such as, for example, and without limitation, information on all routes from departure to destination, driving speed information of the vehicle 10, lane change information of the vehicle 10, surrounding information of the vehicle 10, weather information, time information, or the like.

Referring to FIG. 1, the autonomous driving apparatus 100 (see, e.g., FIGS. 2 and 3) may obtain a plurality of driving routes using various information. As an example, the autonomous driving apparatus 100 may obtain a first driving route 100-1 and a second driving route 100-2. The first driving route may be a shortest driving route from departure to destination, and the second driving route may be a user-preferred driving route from departure to destination.

The autonomous driving apparatus 100 may, for example, set one of the plurality of obtained driving routes as a driving route. The driving route may, for example, be obtained based on various information such, for example, and without limitation, as destination information, user's driving history, traffic information, pre-stored map information, state information of the vehicle 10, state information of the surroundings of the vehicle 10, or the like, provided to a model trained through an artificial intelligence algorithm as input data.

According to an embodiment, based on a user command for changing a driving route being input while driving along a driving route of the vehicle 10, the autonomous driving apparatus 100 may obtain a new driving route based on, for example, and without limitation, information on a driving route change corresponding to a user command, destination information, driving history, traffic information, or the like, provided to a model trained through an artificial intelligence algorithm.

The driving route may be obtained based on the various input data provided to a model trained by an artificial intelligence algorithm. For example, the autonomous driving apparatus 100 may obtain at least one first driving route to destination based on destination information and traffic information to the trained first model. The first driving route may, for example, and without limitation, be one of a minimum time driving route, a shortest distance driving route, and a minimum cost driving route. In addition, the autonomous driving apparatus 100 may obtain a second driving route based on, for example, and without limitation, the destination information and the user's driving history provided to the trained second model. The second driving route may, for example, be a driving route usually preferred by a user.

The autonomous driving apparatus 100 may select a driving route suitable for a user from between the obtained first and second driving routes to provide. For example, the autonomous driving apparatus 100 may determine one of the first driving route and the second driving route based, for example, and without limitation, on traffic information, time information for driving, present time information, or the like.

Figure 2:
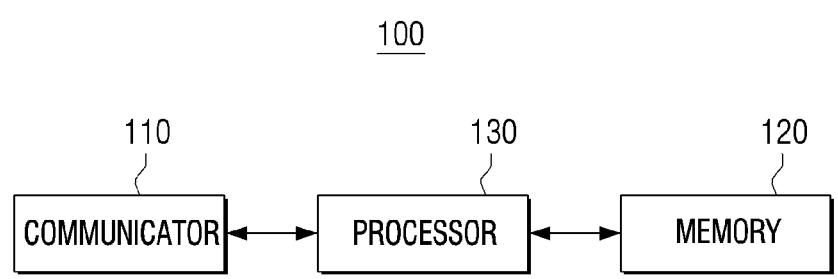
FIG. 2 is a block diagram illustrating an example configuration of an autonomous driving apparatus according to an embodiment of the present disclosure.

FIG. 2 is a block diagram illustrating an example configuration of an autonomous driving apparatus according to an embodiment of the present disclosure.

Referring to FIG. 2, an autonomous driving apparatus 100 may include a communicator (e.g., including communication circuitry) 110, a memory 120, and a processor (e.g., including processing circuitry) 130.

The communicator 110 may include various communication circuitry and may perform communication with an external apparatus. For example, and without limitation, the autonomous driving apparatus 100 may receive destination information and traffic information for setting a route through the communicator 110.

The memory 120 may store various data related to the autonomous driving apparatus 100. For example, the memory 120 may store user's driving history and map information. The memory 120 may store an artificial intelligence model for driving route setting.

The processor 130 may include various processing circuitry and control the overall operations of the autonomous driving apparatus 100. For example, the processor 130 may provide, for example, and without limitation, destination information, driving history, and traffic information to a model trained through an artificial intelligence algorithm as input data to determine a driving route to destination, and control the vehicle 10 to perform autonomous driving based on the determined driving route.

As described above, while the vehicle 10 drives along the determined driving route, based on a user command for changing a driving route being input, the processor 130 may provide information on, for example, and without limitation, a driving route change corresponding to the user command, destination information, driving history, traffic information, or the like, to the trained model and determine a new driving route.

When a driving route is changed based on the user command, the processor 130 may update user's driving history based on information on the changed driving route and store the updated driving history in the memory 120. The information on the updated driving route may be reflected when a driving route is set later. When a user command is a command to bypass a specific route, the autonomous driving apparatus 100 may determine a driving route except for the specific route to bypass requested by a user when a driving route is set later. For example, when a user command is "bypass the Gangnamdaero", the autonomous driving apparatus 100 may update information that the user does not prefer the Gangnamdaero, and when there is a driving route via the Gangnamdaero, may provide a driving route bypassing the Gangnamdaero to the user.

The driving route may be obtained by inputting (providing) the various input data to the model trained by the artificial intelligence algorithm. As described above, the processor 130 may obtain at least one driving route to destination by inputting (providing) destination information and traffic information to the trained first model, and may obtain a second driving route by inputting (providing) destination information and user's driving history to the trained second model.

The autonomous driving apparatus 100 may select a driving route suitable for a user from between the obtained first and second driving routes. The autonomous driving apparatus 100 may determine one of the first driving route and the second driving route based, for example, and without limitation, on traffic information, time information for driving, present time information, or the like.

The processor 130 may obtain a driving habit of a user by inputting (providing) road information and user's driving history to the model trained by the artificial intelligence algorithm, and control the vehicle 10 to perform autonomous driving based on the obtained driving habit. For example, when the user has driving habits of, for example, and without limitation, changing a lane after traffic light is changed, user preferred driving speed, the strength/number of times the user presses a brake, preference to the first lane, or the like, the processor 130 may obtain a user driving habit based on the user driving history, and control the vehicle 10 based on the user driving habit.

Figure 3:
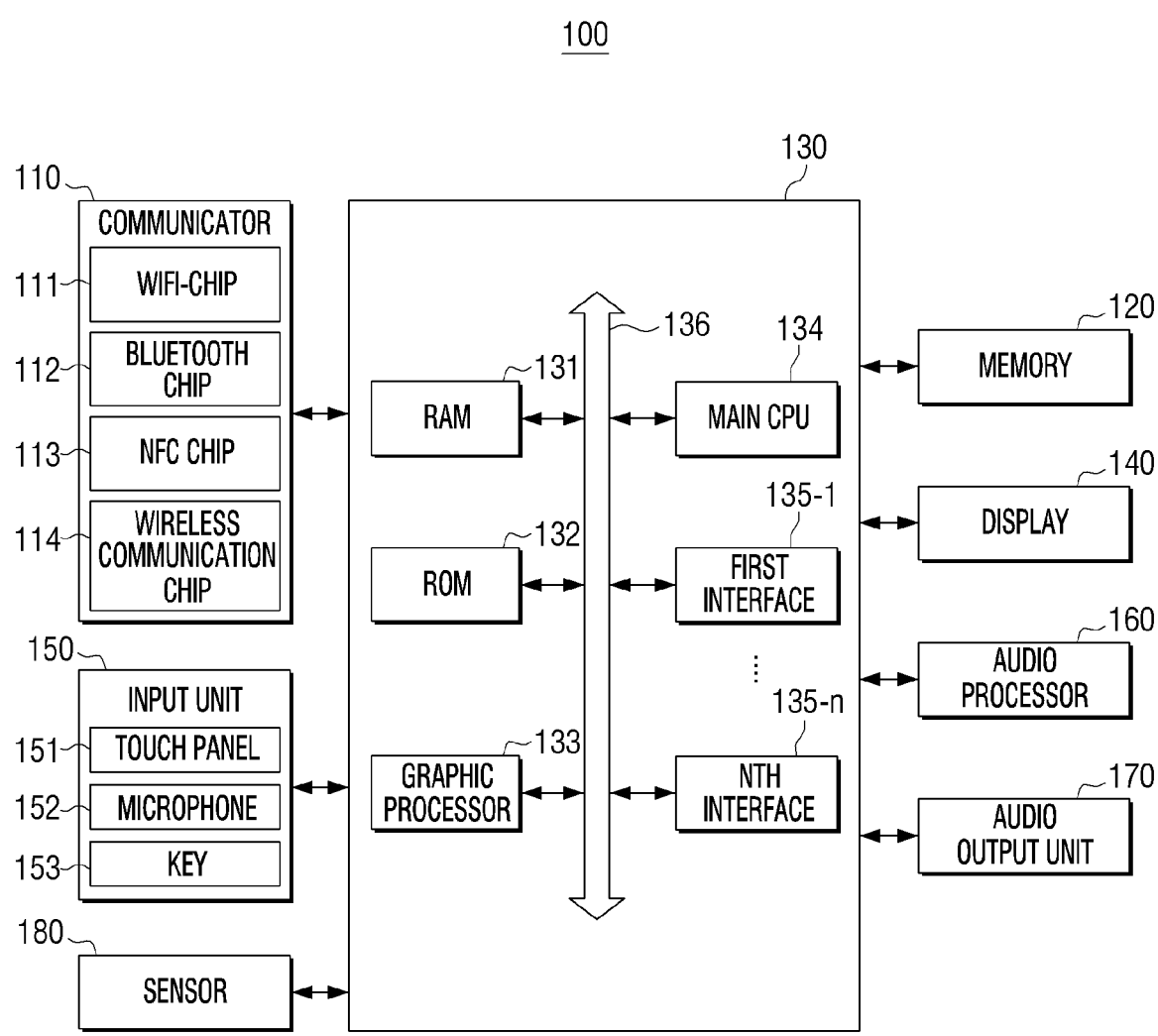
FIG. 3 is a block diagram illustrating an example configuration of an autonomous driving apparatus according to an embodiment of the present disclosure.

FIG. 3 is a block diagram illustrating an example configuration of an autonomous driving apparatus 100 according to an embodiment of the present disclosure.

Referring to FIG. 3, an autonomous driving apparatus 100 may include a communicator (e.g., including communication circuitry) 110, a memory 120, a processor (e.g., including processing circuitry) 130, a display 140, an input unit (e.g., including input circuitry) 150, an audio processor (e.g., including audio processing circuitry) 160, an audio output unit (e.g., including audio output circuitry) 170, and a sensor 180. However, the present disclosure is not limited thereto, some configurations could be added to or omitted from the autonomous driving apparatus 100 as needed.

The communicator 110 may include various communication circuitry and may perform communication with an external apparatus. The communicator 110 may include various communication circuitry included in various communication chips, such as, for example, and without limitation, a Wi-Fi chip 111, a Bluetooth chip 112, a wireless communication chip 113, an NFC chip 114, or the like. For example, the Wi-Fi chip 111, the Bluetooth chip 112, and the NFC chip 114 may perform communication using the LAN method, the Wi-Fi method, the Bluetooth method, and the NFC method, respectively. When the Wi-Fi chip 111 or the Bluetooth chip 112 is used, various connectivity information such as an SSID and a session key may be transmitted and received first, communication connection may be established based on the connectivity information, and various information may be transmitted and received based thereon. The wireless communication chip 113 may refer, for example, to a chip that performs communication according to various communication standards such as IEEE, ZigBee, 3rd Generation (3G), 3rd Generation Partnership Project (3GPP), Long Term Evolution (LTE), or the like. The communicator 110 may use a wired communication method including, for example, and without limitation, at least one of a universal serial bus (USB), a high definition multimedia interface (HDMI), a recommended standard 232 (RS-232), a power line communication or a plain old telephone service (POTS), or the like.

The communicator 110 may receive destination information and traffic information for route setting, but the present disclosure is not limited thereto. When the communicator 110 performs communication with an external server, the external server may perform various functions of the processor 130, and transmit the performed functions through communicator 110. For example, the communicator 110 may receive driving route information generated by the external server.

The memory 120 may store commands or data relating to at least one other element of the autonomous driving apparatus 100. For an example embodiment, the memory 120 may include, for example, and without limitation, middleware, application programming interface (API) and/or application program (or application), or the like. At least part of kernel, middleware, or API may be referred to as an operation system. The kernel, for example, controls or manages system resources used for executing operations of functions embodied in other programs. In addition, the kernel may access individual constituent element of the autonomous driving apparatus 100 in the middleware, the API, or the application program and provide an interface to control or manage the system resources.

The middleware, for example, may perform an intermediary function so that the API or the application program may communicate with the kernel to exchange data. In addition, the middleware may process at least one or more task requests received from the application program according to the priority. For example, the middleware may give the priority for using the system resources of the autonomous driving apparatus 100 to the application programs, and process the at least one or more task requests. The API may an interface for an application to control the functions provided by the kernel or the middleware, for example, at least one interface or function (e.g., command) for file control, window control, image processing, or text control.

In addition, the memory 120 may include, for example, at least one of an internal memory and an external memory. The internal memory may be, for example, and without limitation, a volatile memory (e.g., DRAM, SRAM, or SDRAM), a non-volatile memory (e.g., an OTPROM, a PROM, an EPROM, an EEPROM, a mask ROM, a flash ROM, a flash memory, a hard drive, a solid state drive (SSD)), or the like. The external memory may be a flash drive, for example, and without limitation, a compact flash (CF), a secure digital (SD), a micro-SD, a mini-SD, an extreme digital (xD), a multi-media card (MMC), a memory stick, or the like. The external memory may be functionally or physically connected to the autonomous driving apparatus 100 via various interfaces.

The display 140 may output various information. For example, the display 140 may display the determined driving route. For another example, the display 140, when the determined driving route is not a driving route preferred by a user, may display a UI including a message that the determined driving route is not a driving route preferred by a user. For another example, the display 140 may display a UI including a first driving route determined by a first model, and a second driving route determined by a second model.

The display 140 for providing various information may be implemented in various types or sizes of display panels. For example, and without limitation, the display panel may be embodied with a liquid crystal display (LCD), an organic light emitting diode (OLED), an active matrix organic light-emitting diode (AM-OLED), a liquid crystal on silicon (LcoS), digital light processing (DLP), or the like. The display 140 may be combined with at least one of a front surface region, a side surface region, and a rear surface region of the autonomous driving apparatus 100 in the form of a flexible display.

The input unit 150 may include various input circuitry and may receive a user command. The input unit 150 may include various input circuitry, such as, for example, and without limitation, a touch panel 151, a microphone 152, a key 153, or the like.

The touch panel 151 may be configured by combining the display 140 with a touch sensor (not shown), and the touch sensor may use, for example, and without limitation, at least one of an electrostatic type, a pressure sensitive type, an infrared type, an ultrasonic type, or the like. The touch screen may include a display function as well as a sensing function of a touch input position, a touch area and a touch input pressure. In addition, the touch screen may include sensing functions of not only a real-touch but also a proximity touch.

The microphone 152 may be configured to receive a user voice. The microphone 152 may receive sound signals from external sources and generate electrical voice information. The microphone 152 may use various noise elimination algorithms for removing noise generated by receiving the external sound signals. The microphone 152 may include, for example, and without limitation, at least one of a built-in microphone, an external microphone, or the like. The key 153 may include, for example, and without limitation, a physical button, an optical key, a keypad, or the like.

The input unit 150 may receive external commands from various configurations and transmit the commands to the processor 140. The processor 140 may control the autonomous driving apparatus 100 by generating control signals corresponding to the received inputs.

The audio processor 160 may include various audio processing circuitry and/or program elements and perform processing of audio data. The audio processor 160 may perform various processing, for example, and without limitation, decoding, amplifying, noise filtering, or the like. The audio data processed by the audio processor 160 may be output to the audio output unit 170.

The audio output unit 170 may include various audio output circuitry and may output various alarming sounds or voice messages in addition to various audio data processed by the audio processor 160 based on various processes such as, for example, and without limitation, decoding, amplifying, noise filtering, or the like. The audio output unit 170 may be embodied, for example, as a speaker, but is not limited thereto, and may be embodied, for example, as an output terminal that could output audio data, but is not limited thereto.

The sensor 180 may be configured to sense various information in the vicinity of the autonomous driving apparatus 100. The sensor 100 may obtain various sensing information for determining the driving status of the vehicle 10. The sensing information may include, for example, and without limitation, the state information of the vehicle 10, the state information on road on which the vehicle 10 drives, weather information, or the like.

The sensor 180 may include various sensors such as, for example, and without limitation, an acceleration sensor, a gyro sensor, a proximity sensor, a temperature and air quality sensor, an airbag sensor, a tire air pressure sensor, a camera, a geomagnetic sensor, a shock sensor, or the like. The acceleration sensor may be a sensor that measures the acceleration or impact strength of the moving vehicle 10. The gyroscope sensor may recognize the six-axis direction by rotating the existing acceleration sensor and help to recognize more detailed and precise motion. The proximity sensor may be a sensor for detecting the proximity of a vehicle 20 in the vicinity of the vehicle 10 on the basis of the driving vehicle 10. The temperature and air quality sensor measures the temperature and the concentration of carbon dioxide ($CO_2$) in the vehicle 10. The airbag sensor may be a sensor for detecting whether the airbag is operated to protect the driver's body from a car crash of the vehicle 10, and the tire air pressure sensor may be a sensor for measuring and sensing the supply pressure state of the tire of the vehicle 10. The camera may be a sensor for photographing a driver who gets in the vehicle 10. The geomagnetism sensor may be a sensor for detecting the position of the vehicle 10. The gravity sensor may be a sensor for detecting the direction of the vehicle 10 by sensing in which direction gravity acts, and the lane departure detection sensor may be a sensor for detecting whether the driving vehicle 10 is normally driving without leaving the lane. The impact sensor may be a sensor for detecting the impact strength of the vehicle. The operation of the airbag can be determined depending on the impact strength detected by the impact sensor.

The processor 130 may include various processing circuitry and control the overall operations of the autonomous driving apparatus 100 using the various programs stored in the memory 120.

The processor 130 may include, for example, and without limitation, a ROM 132, a RAM 131, a CPU 134, a graphic processing unit (GPU) 133, first to nth interfaces 135-1 to 135-n, and a bus 136. The RAM 131, the ROM 132, the CPU 134, the graphic processing unit (GPU) 133, and the first to nth interfaces 135-1 to 135-n may be connected to one another via the bus 136.

The RAM 131 may store an operation system (O/S) and an application program. For example, when the autonomous driving apparatus 100 is booted, the O/S may be stored in the RAM 131, and various application data selected by the user may be stored in the RAM 131.

A command set, etc. for system botting may be stored in the ROM 132. When a turn-on command is input and power is supplied, the CPU 134 may copy the O/S stored in the memory 110 to the RAM 131 according to the command stored in the ROM 132, execute the O/S and perform system booting. When the booting is completed, the CPU 134 may copy various application programs stored in the memory 120 to the RAM 131, execute the application programs copied to the RAM 131, and perform various operations.

The graphic processor 133 may generate a screen including various objects such as icons, images, texts, etc. using a calculation unit (not shown) and a rendering unit (not shown). The calculation unit may calculate attribute values such as coordinate values, shapes, sizes, colors, etc. of the objects according to the layout of the screen using the control command received from the input unit 150. The rendering unit may generate screens of various layouts including objects based on the attribute values calculated by the calculation unit. The screen generated by the rendering unit may be displayed in a display region of the display 140.

The CPU 134 may access the memory 120 and perform booting using the O/S stored in the memory 120. The CPU 134 may perform various operations using various program, contents, data, etc. stored in the memory 120.

The first to nth interfaces 135-1 to 135-n may be connected to various constituent elements described above. One of the first to nth interfaces 135-1 to 135-n may be a network interface connected to an external device through a network.

Hereinafter, various example embodiments of the present disclosure will be described in greater detail below with reference to FIGS. 4A to 7B.

Figure 4A:
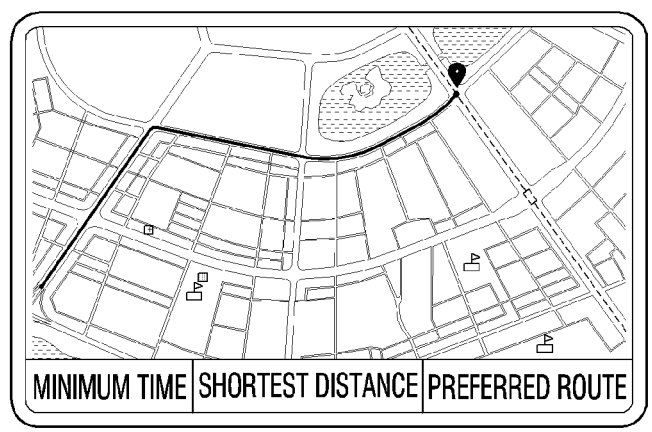
FIG. 4A is a diagram illustrating an example driving route setting method according to an embodiment of the present disclosure.
Figure 4C:
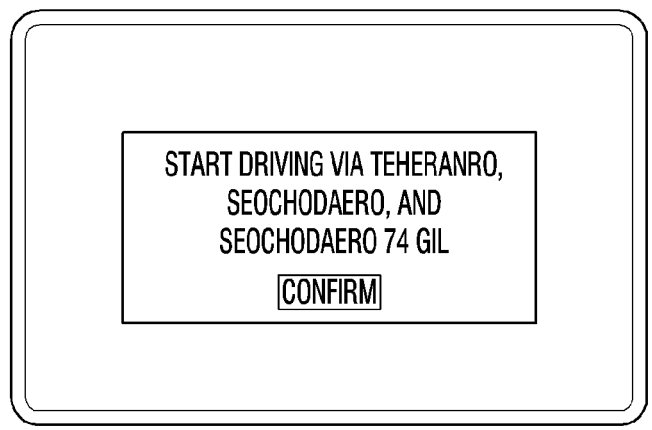
FIG. 4C is a diagram illustrating an example driving route setting method according to an embodiment of the present disclosure.

FIGS. 4A, 4B and 4C are diagrams illustrating an example driving route setting method according to an embodiment of the present disclosure.

Referring to FIG. 4A, an autonomous driving apparatus 100 may display a UI providing the obtained various driving routes through an artificial intelligence algorithm. For example, the autonomous driving apparatus 100 may display icons for selecting, for example, and without limitation, a minimum time driving route, a shortest distance driving route, a user-preferred route, or the like. The minimum tine and the shortest distance driving route may, for example, be a route obtained based on destination information and traffic information provided to the trained first model, and the user-preferred route may, for example, be a driving route based on destination information, traffic information and user driving history provided to the trained second model.

The autonomous driving apparatus 100 may display a drivable driving route list as illustrated, for example, in FIG. 4B. For example, the autonomous driving apparatus 100 may display a route including a driving route in text format.

The user may input a user command for selecting a driving route through a UI illustrated in FIGS. 4A and 4B. Based on a user command being input, the autonomous driving apparatus 100 may control the vehicle 10 to perform driving along a driving route corresponding to the user command.

FIGS. 4A and 4B illustrate a method for driving a vehicle 10 along a driving route corresponding to a user command among a plurality of drivable driving routes. For example, based on receiving a destination from a user, the autonomous driving apparatus 100 may input (provide), for example, and without limitation, destination information, traffic information, user driving history, or the like, to a model trained through an artificial intelligence algorithm as input data and determine a driving route to destination by itself. The autonomous driving apparatus 100 may obtain a first driving route based on the destination information and the traffic information provided to the trained first model, and obtain the second driving route based on the destination information, the traffic information and the user driving history provided to the trained second model, compare the first driving route with the second driving route to determine an optimal driving route. The autonomous driving apparatus 100 may obtain an optimal driving route based on the obtained first and second driving routes provided to the trained model as new input data. However, the present disclosure is not limited thereto. The autonomous driving apparatus 100 may compare the first driving route with the second driving route and determine an optimal driving route. For example, the autonomous driving apparatus 100 may compare a time required for driving along the first driving route with a time required for driving along the second driving route. The autonomous driving apparatus 100 may compare a driving distance of the first driving route with a driving distance of the second driving route. The autonomous driving apparatus 100 may compare a cost required for driving along the first driving route with a cost required for driving along the second driving route. The autonomous driving apparatus 100 may determine whether routes included in the first driving route and the second driving route are preferred by a user or not.

As described above, when the optimal driving route is determined, the autonomous driving apparatus 100, as illustrated in FIG. 4C, may determine a driving route 2 as an optimal driving route without a user command, display a UI "start driving via Teheranro, Seochodaero and Seochodaero 74 gil" and drive the vehicle 10. The UI may also provide an input for the user to confirm the determined optimal driving route, as illustrated in FIG. 4C.

Figure 5A:
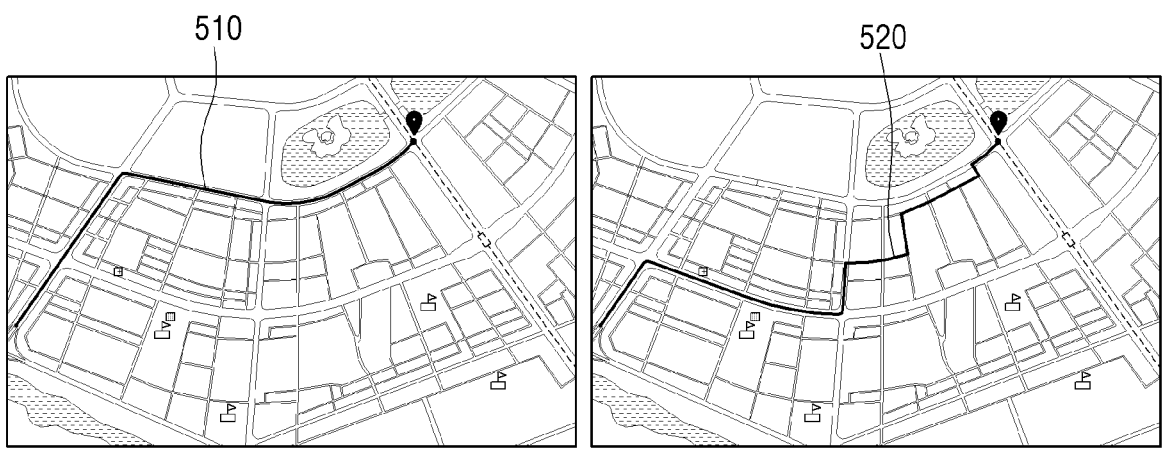
FIG. 5A is a diagram illustrating an example method for changing a driving route based on a user command being received while driving according to an embodiment of the present disclosure.
Figure 5B:
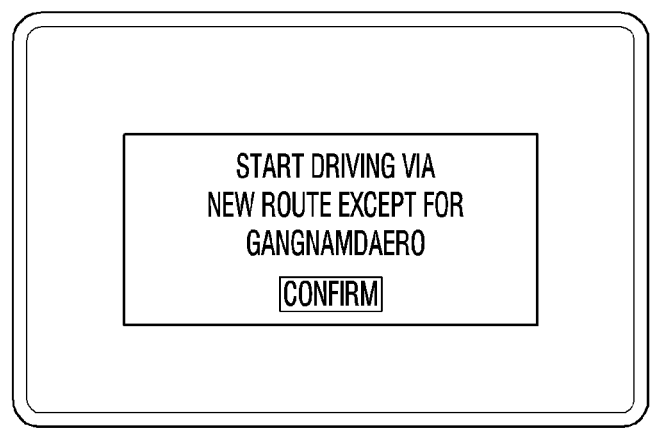
FIG. 5B is a diagram illustrating an example method for changing a driving route based on a user command being received while driving according to an embodiment of the present disclosure.

FIGS. 5A and 5B are diagrams illustrating an example method for changing a driving route based on a user command being received while driving according to an embodiment of the present disclosure.

The autonomous driving apparatus 100 may drive the vehicle 10 along a determined driving route 510. During driving, when the driving route 510 needs to be changed by a user command, the autonomous driving apparatus 100 may obtain a new driving route based on a user command, and drive the vehicle 10 along a new driving route.

A user command may be various types of user commands. For example and without limitation, the user command may be a command to request a user to drive along a preferred route or a command to request a user to drive along a route except for a non-preferred route. For example, a user command may be a command to request a user to drive along a user-preferred route such as "start driving via the Teheranro", or a command to request a user to drive along a non-preferred route such as "bypass the Teheranro".

Based on the user command being input, the autonomous driving apparatus 100 may input information on a driving route change corresponding, for example, and without limitation, to the input user command, destination information, user driving history, traffic information, or the like, provided to a trained model and determine a new driving route 520. The autonomous driving apparatus 100 may drive a vehicle along the determined new driving route 520.

When a driving route is changed based on a user command, the autonomous driving apparatus 100 may display a message UI informing that a driving route is changed. For example, referring to FIG. 5B, the autonomous driving apparatus 100 may display a message UI such as "start driving via new route except for Gangnamdaero" in response to a user command "do not take on the Gangnamdaero". However, although not shown, the autonomous driving apparatus 100 may display a message UI such as "start driving via the Tereranro" in response to a user command "start driving via the Teheranro".

FIG. 5B illustrates a method for outputting a message UI through the display 140, but the present disclosure is not limited thereto. In other words, the autonomous driving apparatus 100 may output audio such as "start on a new road except for the Gangnamdaero", or "start driving via the Tereranro" through the audio output unit 170. The UI may also provide an input for the user to confirm the determined driving route, as illustrated in FIG. 5B.

Figure 6A:
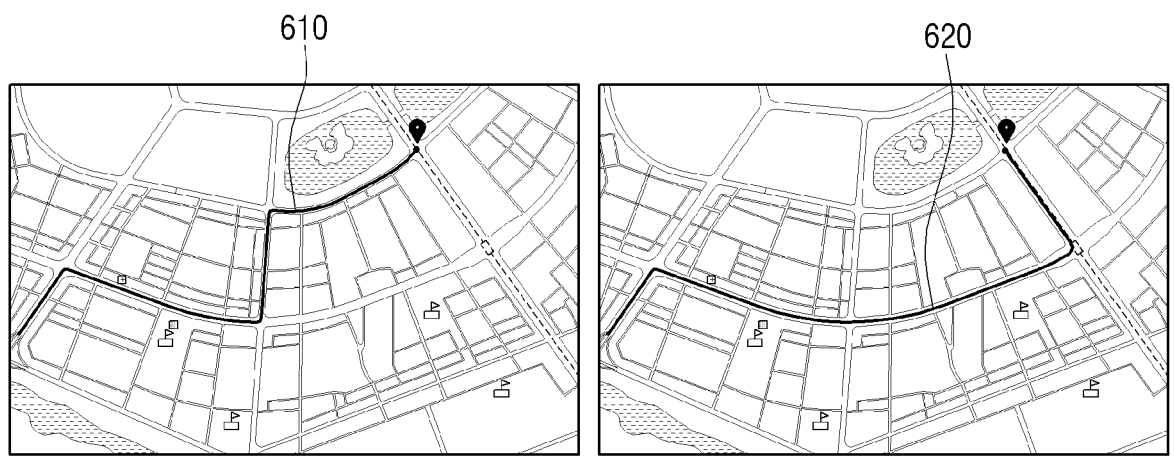
FIG. 6A is a diagram illustrating an example method for changing a driving route when an abnormal situation occurs while driving according to an embodiment of the present disclosure.
Figure 6B:
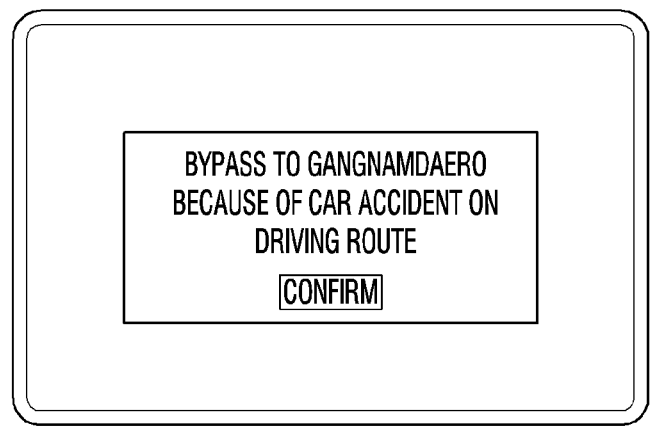
FIG. 6B is a diagram illustrating an example method for changing a driving route when an abnormal situation occurs while driving according to an embodiment of the present disclosure.

FIGS. 6A and 6B are diagrams illustrating an example method for changing a driving route when an abnormal situation occurs while driving according to an embodiment of the present disclosure.

The autonomous driving apparatus 100 may determine an optimal driving route 620 to destination in real time during driving along the determined driving route 610. For example, the autonomous driving apparatus 100 may determine the optimal driving route 620 based, for example, and without limitation, on traffic information and road information, or the like, provided to the trained model by an artificial intelligence algorithm as input data during driving along the determined driving route 610. The autonomous driving apparatus 100 may compare the currently driven driving route 610 with the optimal driving route 620 determined in real time. The autonomous driving apparatus 100 may change a driving route when it is determined that the driving route 620 determined in real time is faster to destination than the currently driven driving route 610.

For example, when the traffic information (e.g., traffic accident) of the currently driven driving route 610 is changed, the currently driven driving route 610 is used, and the arrival time to destination is significantly delayed, the autonomous driving apparatus 100 may change a driving route to the driving route 620 determined in real time.

According to the above-described example embodiment, it is described that the autonomous driving apparatus 100 determines a driving route in real time, but the present disclosure is not limited thereto. For example, the autonomous driving apparatus 100 may determine a driving route at a predetermined time interval or at a predetermined distance. The autonomous driving apparatus 100 may determine a new driving route when a plurality of roads included in the driving route are changed. For example, when the autonomous driving apparatus 100 drives along a driving route 1 shown in FIG. 4B, the autonomous driving apparatus 100 may determine a new driving route before leaving the Tereranro (or after entering the Gangnamdaero), and before leaving the Gangnamdaero (or after entering the Gangnamdaero 55 gil).

When the currently driven driving route 610 is changed to the driving route 620 determined in real time, referring to FIG. 6B, the autonomous driving apparatus 100 may display a message UI informing the reason why the driving route is changed, and the changed driving route. In other words, when the autonomous driving apparatus 100, when the driving route is changed, displays a message UI such as "bypass to Gangnamdaero because of car accident on driving route". As described above, the autonomous driving apparatus 100 may also output audio corresponding to the message bypass to Gangnamdaero because of car accident on driving route" through the audio output unit 170. The UI may also provide an input for the user to confirm the determined changed driving route, as illustrated in FIG. 6B.

Figure 7A:
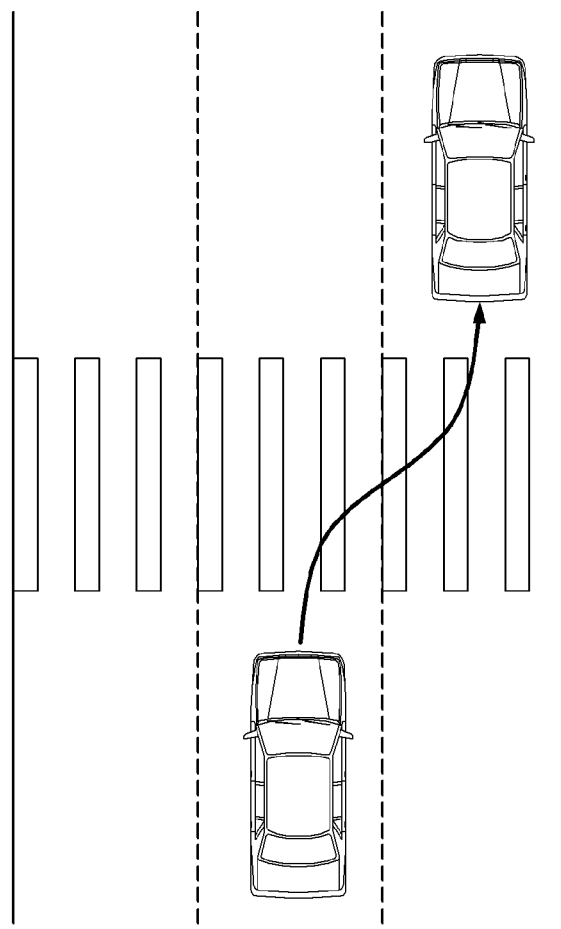
FIG. 7A is a diagram illustrating an example method of an autonomous driving apparatus for driving a vehicle reflecting a driving habit of a user according to an embodiment of the present disclosure.
Figure 7B:
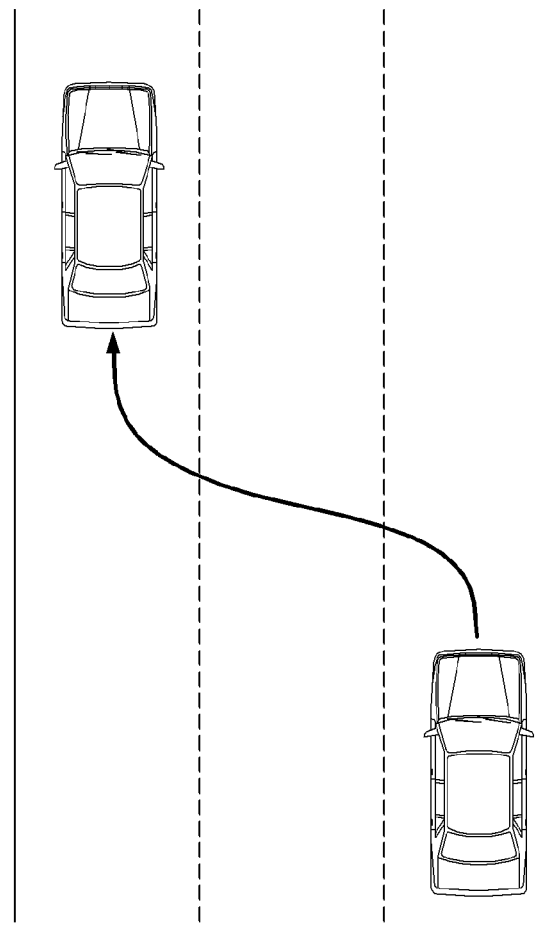
FIG. 7B is a diagram illustrating an example method of an autonomous driving apparatus for driving a vehicle by reflecting a driving habit of a user according to an embodiment of the present disclosure.

FIGS. 7A and 7B are diagrams illustrating an example method of an autonomous driving apparatus for driving a vehicle reflecting a driving habit of a user according to an embodiment of the present disclosure.

FIGS. 4A, 4B, 4C, 5A, 5B, 6A and 6B illustrate example methods in which an autonomous driving apparatus 100 determines a driving route based on various data, but the autonomous driving apparatus 100 may drive the vehicle 10 in the similar manner as the user driving style by training the driving habit of a user.

For example, the autonomous driving apparatus 100 may determine a driving habit of a user based on, for example, and without limitation, user driving history, traffic information state information, or the like, provided to a model trained through an artificial intelligence algorithm as input data. The driving habit of the user may vary such as, for example, and without limitation, user-preferred lane, user-preferred lane change time, user-preferred driving speed, or the like. For example, referring to FIG. 7A, when the user has a driving habit for changing lanes after waiting for the traffic light change on the crosswalk, the autonomous driving apparatus 100 may change the lane of the vehicle 10 when starting after waiting for the traffic light change on the crosswalk. Referring to FIG. 7B, when the user is used to driving along the first lane, the autonomous driving apparatus 100 may control the vehicle 10 to drive along the first lane. However, the above-described driving habit is not limited thereto. The driving habit obtained based on user driving history, road information and surrounding state information may vary such as, for example, and without limitation, an excel operation (an acceleration operation), a brake operation (a deceleration operation), a handling operation, or the like.

Hereinafter, referring to FIGS. 8, 9, 10 and 11, according to an example embodiment of the present disclosure, a method for determining a driving route to destination or a driving habit through a data recognition model after generating a data recognition model using a learning algorithm is described in greater detail.

Figure 8:
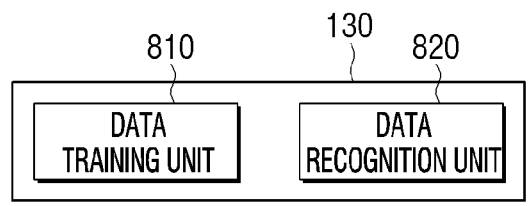
FIG. 8 is a block diagram illustrating an example method for determining a driving route to destination or a driving habit through a data recognition model after generating a data recognition model using a learning algorithm according to an embodiment of the present disclosure.

Referring to FIG. 8, a processor 130 may include a data training unit (e.g., including processing circuitry and/or program elements) 810 and a data recognition unit (e.g., including processing circuitry and/or program elements) 820.

A data training unit 810 may include various processing circuitry and/or program elements and train a data recognition model to determine a driving route to destination and to have criteria for determining a driving habit. In addition, the data training unit 810 may train a data recognition model to have criteria for determining an operation of the autonomous driving apparatus 100 with regard to data. The data training unit 810 may apply training data to a data recognition model for determining the operation of the autonomous driving apparatus 100 for determining a driving route to destination or a driving habit, and generate a data recognition model having criteria.

For example, the data training unit 810 may user various data (destination information, user driving history, traffic information, pre-stored map information, state information of the vehicle 10, state information of the surroundings of the vehicle 10, or the like) as training data and generate or train a data recognition model.

The data recognition unit 820 may include various processing circuitry and/or program elements and determine a state based on recognition data. The data recognition unit 820 may use the trained data recognition model, and determine a situation based on predetermined recognition data. The data recognition unit 820 may obtain predetermined recognition data depending on predetermined criteria, apply the obtained recognition data to a data recognition model as an input value, and determine (or estimate) a predetermined situation based on the predetermined recognition data.

The result value output by applying the obtained recognition data to a data recognition model as the input value may be used for updating a data recognition model.

According to an embodiment of the present disclosure, the data recognition unit 820 may apply recognition data of destination information and traffic information to a data recognition model as an input value and obtain a determination result (a first driving route) of the status of the autonomous driving apparatus 100. The data recognition unit 820 may apply destination information and recognition data related to the user driver history to a data recognition model as an input value and obtain a determination result (a second driving route) of the status of the autonomous driving apparatus 100.

The data recognition unit 820 may apply recognition data related to road information, traffic information and driving information to a data recognition model as an input value and obtain a determination result (a driving habit of a user) of the status of the autonomous driving apparatus 100.

At least part of the data training unit 810 and at least part of the data recognition unit 820 may be embodied as a software module (e.g., program element), and/or manufactured as at least one hardware chip (e.g., including processing circuitry and/or program elements) to be mounted on an electronic device. For example, at least one of the data training unit 810 and the data recognition unit 820 may, for example, and without limitation, be manufactured as a hardware chip for an artificial intelligence (AI), as part a general purpose processor (e.g., a CPU or an application processor), as part a graphic use processor (e.g., a GPU) to be mounted on various electronic devices, or the like. The hardware chip for artificial intelligence may, for example, and without limitation, be a processor specialized in probability calculation with higher parallel processing performance than the existing general purpose processor to quickly process arithmetic operations in artificial intelligence such as machine learning. When the data training unit 810 and the data recognition unit 820 may be embodied as a software module (or, a program module including instruction), the software module may be stored in a computer-readable, non-transitory computer readable media. In this case, the software module may, for example, be provided by an operating system (OS) or by a predetermined application. Some of the software modules may, for example, be provided by an Operating System (OS), and others of the software modules may be provided by a predetermined application.

The data training unit 810 and the data recognition unit 820 may be mounted on one autonomous driving apparatus 100 (or an electronic device), or a separate autonomous driving apparatus 100 (or an electronic device). For example, one of the data training unit 810 and the data recognition unit 820 may be included in the autonomous driving apparatus 100, and the other may be included in an external server. The data training unit 810 and the data recognition unit 820 may provide the model information established by the data training unit 810 to the data recognition unit 820 in a wired/wireless manner, and the data input through the data recognition unit 820 may be provided to the data training unit 810 as additional training data.

Figure 9:
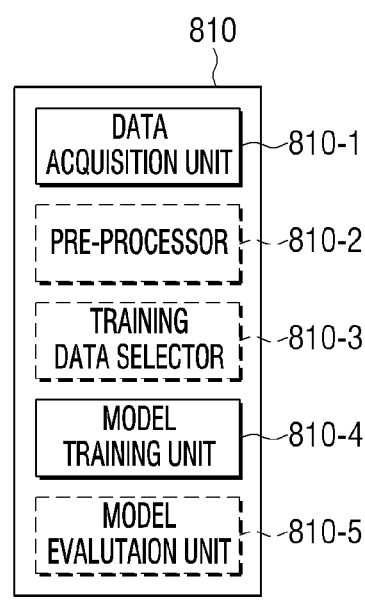
FIG. 9 is a block diagram illustrating an example method for determining a driving route to destination or a driving habit through a data recognition model after generating a data recognition model using a learning algorithm according to an embodiment of the present disclosure.

FIG. 9 is a block diagram illustrating an example data training unit 810.

Referring to FIG. 9, according to various example embodiments of the present disclosure, a data training unit 810 may include a data acquisition unit (e.g., including processing circuitry and/or program elements) 810-1 and a model training unit (e.g., including processing circuitry and/or program elements) 810-4. In addition, the data training unit 810 may further selectively include at least one of a pre-processor (e.g., including processing circuitry and/or program elements) 810-2, a training data selector (e.g., including processing circuitry and/or program elements) 810-3, and a model evaluation unit (e.g., including processing circuitry and/or program elements) 810-5.

The data acquisition unit 810-1 may include various processing circuitry and/or program elements and obtain training data required for the operation of the autonomous driving apparatus 100 for determining a driving route to destination and a driving habit.

The data collected or tested by the data training unit 810 or the manufacturer of the autonomous driving apparatus 100 may be used as training data. The training data may include, for example, and without limitation, the driving history of a user who directly drives a vehicle. The training data may include, for example, and without limitation, traffic information classified according to predetermined criteria. The predetermined criteria may, for example, relate to a specific time, a specific type, etc.

The data training unit 810 may further include the pre-processor 810-2 and the training data selector 810-3 to improve the recognition result of the data recognition model, or save resource or time required for generating a data recognition model.

The pre-processor 810-2 may include various processing circuitry and/or program elements and preprocess the data obtained by the data acquisition unit 810-1.

The pre-processor 810-2 may provide the obtained data in a pre-defined format so that the model training unit 810-4 may use data for training a data recognition model. For example, the pre-processor 810-2 may provide voice data obtained by the data acquisition unit 810-1 as text data, and image data as image data in a predetermined format. The pre-processed data may be provided to the model training unit 810-4 as training data.

The training data selector 810-3 may include various processing circuitry and/or program elements and selectively select training data required for training from among the pre-processed data. The selected training data may be provided to the model training unit 810-4. The training data selector 810-3 may select training data necessary for training from among the pre-processed data according to predetermined selection criteria. The training data selector 810-3 may select training data necessary for training according to predetermined selection criteria by the training of the model training unit 810-4. According to an embodiment of the present disclosure, the training data selector 810-3 may select other vehicles within a predetermined distance from the vehicle 10 from among the surrounding information. The training data selector 810-3 may select only the traffic information, the road information, and the map information corresponding to a user driving route. The training data selector 810-3 may select only the user driving history corresponding to the user driving route.

The model training unit 810-4 may include various processing circuitry and/or program elements and train a data recognition model used for determining a driving route to destination or a driving habit using training data. For example, the model training unit 810-4 may train a data recognition model through supervised learning using at least a part of the training data as determination criteria. The model training unit 810-4, for example, may train itself using training data without additional supervising, and train a data recognition model through unsupervised learning, which finds criteria for determining the situations.

The model training unit 810-4 may train section criteria on which training data is to be used for determining a driving route to destination or a driving habit.

The data recognition model may be established considering, for example, and without limitation, the applicability of a recognition model, the purpose of training, or the computer function of an apparatus. The data recognition model, for example, may be a model based on neural network. The data recognition model may be designed to simulate the human brain structure in a computer. The data recognition model may include a plurality of network nodes having weight values to simulate neurons of the neural network of human being. The plurality of network nodes may establish connection relationships to simulate the synaptic activity to transmit and receive signals through synapses by neurons. For example, the data recognition model may include a neuron network model, a deep-learning model developed from the neuron network model. The plurality of network nodes in the deep-learning model may be disposed in different depths (or layers), and transmit and receive data according to a convolution connection relationship.

For example, a model such as Deep Neural Network (DNN), Recurrent Neural Network (RNN), or Bidirectional Recurrent Deep Neural Network (BDNR) may be used as a data recognition model, but the present disclosure is not limited thereto.

According to various embodiments of the present disclosure, the model training unit 810-4, if there are a plurality of data recognition models built in advance, may determine a data recognition model, in which the input training data and the basic training data are highly relevant, as the data recognition model to be trained. In this case, the basic training data may be pre-classified by data type, and the data recognition model may be pre-built in advance by data type. For example, the basic training data may be pre-classified on the basis of various criteria such as the region where the training data is generated, a time at which training data is generated, the size of the training data, the genre of the training data, the creator of the training data, the type of object in the training data, etc.

The model learning unit 810-4 may also train a data recognition model using a learning algorithm including, for example, an error back-propagation method or a gradient descent method.

The model training unit 810-4, for example, may train a data recognition model through supervised learning using a determination criterion as an input value. In addition, the model training unit 810-4, for example, may train itself using necessary training data without additional training, and train a data recognition model through non-supervised training, which finds a driving route to destination or a driving habit. The model training unit 810-4, for example, may train a data recognition model through reinforcement learning using a feedback on whether the result of the driving route to destination or the driving habit is appropriate according to training.

Based on the data recognition model being trained, the model training unit 810-4 may store the trained data recognition model. The model training unit 810-4 may store the trained data recognition model in the memory 150 of the autonomous driving apparatus 100. The model training unit 810-4 may store the trained data recognition model in a memory of a server connected to the autonomous driving apparatus 100 over a wired/wireless network.

The data training unit 810 may further include a model evaluation unit 810-5 to improve the recognition result of the data recognition model.

The model evaluation unit 810-5 may include various processing circuitry and/or program elements and input evaluation data to the data recognition model, and when the recognition result output from the evaluation data does not satisfy predetermined criteria, may cause the model training unit 810-4 to train by itself again. In this case, the evaluation data may be pre-defined data for evaluating the data recognition model.

For example, the model evaluation unit 810-5, among the recognition result of the data recognition model trained with regard to the evaluation data, when the number or ratio of evaluation data of which recognition result is not accurate exceeds a predetermined threshold value, may evaluate that the predetermined criteria is not satisfied. For example, when the predetermined criteria is defined as a ratio of 2%, and when the trained data recognition model outputs an inappropriate recognition result with regard to the evaluation data exceeding 20 out of 1000 of the evaluation data, the model evaluation unit 810-5 may evaluate that the trained data recognition model is not appropriate.

When there are a plurality of trained data recognition models, the model evaluation unit 810-5 may evaluate that each trained data recognition model satisfies predetermined criteria, and determine the model satisfying the predetermined criteria as a final data recognition model. For example, when there are a plurality of models satisfying the predetermined criteria, the model evaluation unit 810-5 may determine any one or the predetermined number of models preset in descending order of evaluation score, as a final data recognition model.

As described above, at least one of the data acquisition unit 810-1, the pre-processor 810-2, the training data selector 810-3, the model training unit 810-4 and the model evaluation unit 810-5 may be embodied as a software module, and/or manufactured as at least one hardware chip to be mounted on an electronic device. For example, at least one of the data acquisition unit 810-1, the pre-processor 810-2, the training data selector 810-3, the model training unit 810-4 and the model evaluation unit 810-5 may be manufactured as, for example, and without limitation, a hardware chip for artificial intelligence (AI), as part of the existing general-purpose processor (e.g., a CPU or an application processor) or a graphics-dedicated processor (e.g., a GPU), or the like, to be mounted on the various electronic devices described above.

In addition, at least one of the data acquisition unit 810-1, the pre-processor 810-2, the training data selector 810-3, the model training unit 810-4 and the model evaluation unit 810-5 may be mounted on one electronic device, or electronic devices individually. For example, some of the data acquisition unit 810-1, the pre-processor 810-2, the training data selector 810-3, the model training unit 810-4 and the model evaluation unit 810-5 may be included in the electronic device, or others may be included in the server.

At least one of the data acquisition unit 810-1, the pre-processor 810-2, the training data selector 810-3, the model training unit 810-4 and the model evaluation unit 810-5 may be embodied as a software module (program element). When at least one of the data acquisition unit 810-1, the pre-processor 810-2, the training data selector 810-3, the model training unit 810-4 and the model evaluation unit 810-5 is embodied as a software module (or a program module including instruction), the software module may be stored in a computer readable non-transitory computer readable media. In this case, at least one software module may be provided by an operation system (O/S), or a predetermined application. In addition, part of the at least one software module may be provided by the operation system (O/S), or others may be provided by the predetermined application.

Figure 10:
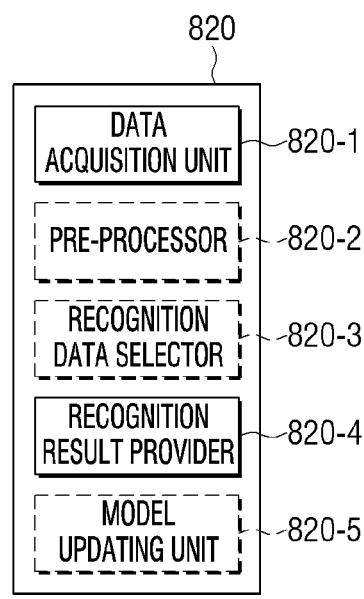
FIG. 10 is a block diagram illustrating an example method for determining a driving route to destination or a driving habit through a data recognition model after generating a data recognition model using a learning algorithm according to an embodiment of the present disclosure.

FIG. 10 is a block diagram illustrating a data recognition unit 820.

Referring to FIG. 10, a recognition unit 820 may include a data acquisition unit (e.g., including processing circuitry and/or program elements) 820-1 and a recognition result provider (e.g., including processing circuitry and/or program elements) 820-4. The data recognition unit 820 may further selectively include a pre-processor (e.g., including processing circuitry and/or program elements) 820-2, a recognition data selector (e.g., including processing circuitry and/or program elements) 820-3, and a model updating unit (e.g., including processing circuitry and/or program elements) 820-5.

The data acquisition unit 820-1 may include various processing circuitry and/or program elements and obtain recognition data necessary for determining a driving route to destination or a driving habit.

The recognition result provider 820-4 may include various processing circuitry and/or program elements and determine a driving route to destination or a driving habit by applying the data obtained by the data acquisition unit 820-1 to the trained data recognition model as the input value. The recognition result provider 820-4 may provide the recognition result according to the purpose of data recognition. The recognition result provider 820-4 may provide the recognition result obtained by applying the data pre-processed by the pre-processor 820-2 to the trained data recognition model as the input value. The recognition result provider 820-4 may provide the recognition result obtained by applying the data selected by the recognition data selector 820-3 to the data recognition model as the input value.

The data recognition unit 820 may further include the pre-processor 820-2 and the recognition data selector 820-3 to improve the recognition result of the data recognition model, or to save resource or time for providing the recognition result.

The pre-processor 820-2 may include various processing circuitry and/or program elements and preprocess data obtained by the data acquisition unit 820-2 to use for determining a driving route to destination or a driving habit.

The pre-processor 820-2 may provide the obtained data in a pre-defined format so that the recognition result provider 820-4 may easily use the data for determining a driving route to destination or a driving habit. According to an embodiment of the present disclosure, the data acquisition unit 820-1 may obtain data for determining a driving route to destination or a driving habit, and the pre-processor 820-2 may preprocess the data in a pre-defined format as described above.

The recognition data selector 820-3 may include various processing circuitry and/or program elements and select recognition data necessary for determining a driving route to destination or a driving habit from among the pre-processed data. The selected recognition data may be provided to the recognition result provider 820-4. The recognition data selector 820-3 may select recognition data necessary for determining a driving route to destination or a driving habit from among the pre-processed data. The recognition data selector 820-3 may select data according to the criteria predetermined by the training of the model training unit 810-4.

The model updating unit 820-5 may include various processing circuitry and/or program elements and control the data recognition model to be updated based on the evaluation of the recognition result provided by the result provider 820-4. For example, the model updating unit 820-5 may provide the recognition result provide by the recognition result provider 820-4 to the model training unit 810-4 so that the model updating unit 810-4 may update a data recognition model.

At least one of the data acquisition unit 810-1, the pre-processor 810-2, the training data selector 810-3, the model training unit 810-4 and the model evaluation unit 810-5 may be embodied as a software module (e.g., program element), and/or manufactured as at least one hardware chip (e.g., including processing circuitry) to be mounted on an electronic device. For example, at least one of least one of the data acquisition unit 810-1, the pre-processor 810-2, the training data selector 810-3, the model training unit 810-4 and the model evaluation unit 810-5 may be manufactured as a hardware chip for artificial intelligence (AI), or part of the existing general purpose processor (e.g., a CPU or an application processor, or part of the graphic user processor (e.g., a GUU) to be mounted on the various electronic devices as described above.

As described above, at least one of the data acquisition unit 810-1, the pre-processor 810-2, the training data selector 810-3, the model training unit 810-4 and the model evaluation unit 810-5 in the data recognition unit 820 may be embodied as a software module, and/or manufactured as at least one hardware chip to be mounted on an electronic device. For example, at least one of least one of the data acquisition unit 810-1, the pre-processor 810-2, the training data selector 810-3, the model training unit 810-4 and the model evaluation unit 810-5 may be manufactured as, for example, and without limitation, a hardware chip for artificial intelligence (AI), part of the existing general purpose processor (e.g., a CPU or an application processor, or part of the graphic user processor (e.g., a GPU), or the like, to be mounted on the various electronic devices as described above.

The data acquisition unit 810-1, the pre-processor 810-2, the training data selector 810-3, the model training unit 810-4 and the model evaluation unit 810-5 may be mounted on one electronic device, or additional electronic devices individually. For example, some of the data acquisition unit 810-1, the pre-processor 810-2, the training data selector 810-3, the model training unit 810-4 and the model evaluation unit 810-5 may be included in the electronic device, and others may be included in the server.

At least one of the data acquisition unit 810-1, the pre-processor 810-2, the training data selector 810-3, the model training unit 810-4 and the model evaluation unit 810-5 in the data recognition unit 820 may be embodied as a software module. When at least one of the data acquisition unit 810-1, the pre-processor 810-2, the training data selector 810-3, the model training unit 810-4 and the model evaluation unit 810-5 is embodied as a software module (or a program module including instruction), the software module may be stored in a computer readable non-transitory computer readable media. In this case, the at least one software module may be provided by an operating system (O/S), or by a predetermined application. Some of the at least one software module may be provided by the operating system (O/S) or others may be provided by a predetermined application.

Figure 11:
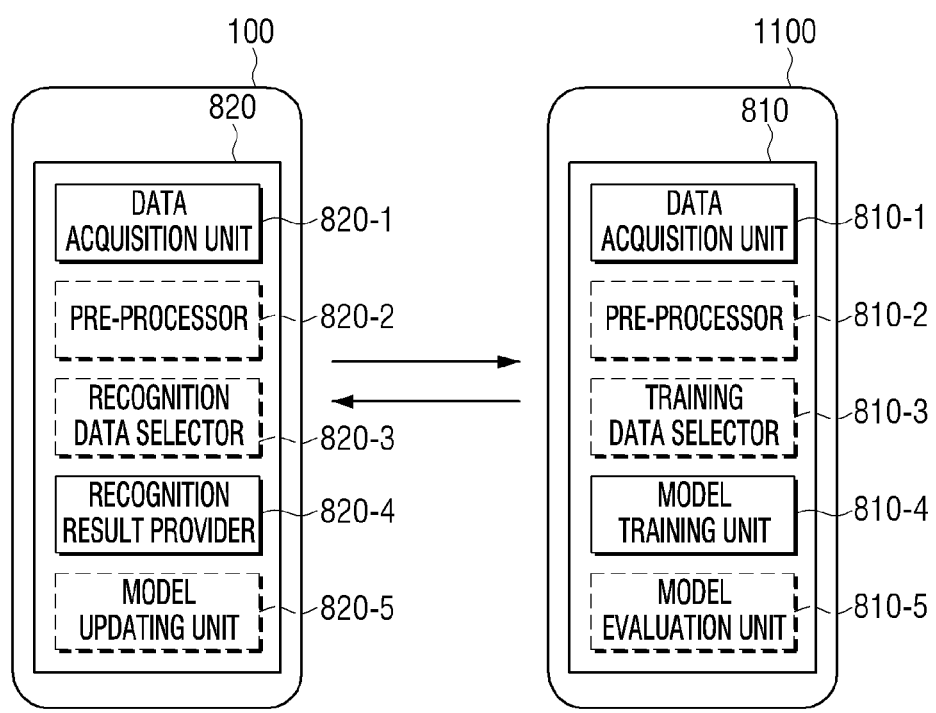
FIG. 11 is a diagram illustrating an example method for determining a driving route to destination or a driving habit through a data recognition model after generating a data recognition model using a learning algorithm according to an embodiment of the present disclosure.

FIG. 11 is a diagram illustrating an example in which an autonomous driving apparatus 100 is operable in association with a server 1100 to train and recognize data.

Referring to FIG. 11, a server 1100 may train criteria for determining a driving route to destination, or a driving habit, and an autonomous driving apparatus 100 may determine a driving route to destination or a driving habit based on the result of training performed by the server 1100.

The model training unit 810-4 of the server 1100 may train criteria on which data is to be used for determining a driving route to destination or a driving habit, or how to determine a driving route to destination or a driving habit using data. The model training unit 810-4 may obtain data to be used for training, apply the obtained data to the data recognition model to be described below, and train the criteria for determining a driving route to destination or a driving habit.

The recognition result provider 820-4 of the autonomous driving apparatus 100 may determine a driving route to destination or a driving habit by applying the data selected by the recognition data selector 820-3 to the data recognition model generated by the server 1100. The recognition result provider 820-4 may transmit the data selected by the recognition data selector 820-3 to the server 1100, and the server 1100 may apply the data selected by the recognition data selector 820-3 to the recognition model, and request the recognition model to determine a driving route to destination or a driving habit. The recognition result provider 820-4 may receive information on the driving route to destination or the driving habit determined by the server 1100 from the server 1100. For example, when data is transmitted to the server 1100 by the recognition data selector 820-3, the server 1100 may apply the data to a pre-stored data recognition model and transmit information on the driving route to destination or the driving habit to the autonomous driving apparatus 100.

The recognition result provider 820-4 of the autonomous driving apparatus 100 may receive the recognition model generated by the server 1100 from the server 1100, and determine a driving route to destination or a driving habit using the received recognition model. In this case, the recognition result provider 820-4 of the autonomous driving apparatus 100 may determine a driving route to destination or a driving habit by applying the data selected by the recognition data selector 820-3 to the data recognition model received from the server 1100. For example, the autonomous driving apparatus 100 may receive the data recognition model from the server 1100 and store the data recognition model, apply the data selected by the recognition data selector 820-3 to the data recognition model received from the server 1100, and determine information on a driving route to destination or a driving habit.

FIG. 12 is a flowchart illustrating an example method of controlling an autonomous driving apparatus according to an embodiment of the present disclosure.

The autonomous driving apparatus 100 may receive a destination for setting a route from a user at step S1210. A destination may be received from a user in various manners. For example, the destination may be input by a touch panel provide in the autonomous driving apparatus 100, or by analyzing a user voice input through a microphone, but the present disclosure is not limited thereto.

The autonomous driving apparatus 100 may obtain user driving history and traffic information at step S1220. The user driving history may be a history for driving a vehicle 10 in a non-autonomous driving situation, and the driving history may include road information, lane information, and speed information of the vehicle 10 in the non-autonomous driving situation. The traffic information may be information on present traffic conditions and can be received from an external device or an external server.

The autonomous driving apparatus 100 may provide the destination information, the driving history, and the traffic information to a model trained through an artificial intelligence algorithm as input data and determine a driving route to destination at step S1230. As described above, the trained model may include a plurality of models. The first model may input the destination information and the traffic information as input data and determine an optimal driving route (the minimum time, the shortest distance, and the minimum cost), and the second model may determine a driving route preferred by a user by inputting the destination information and the user history. The autonomous driving apparatus 100 may determine a final driving route based on the plurality of driving routes obtained by the first model and the second model.

The autonomous driving apparatus 100 may perform autonomous driving along the determined final driving route at step S1240.

While the present disclosure has been described that all elements of an embodiment are coupled to one another or operate in combination, it is to be understood that the present disclosure is not limited to the disclosed embodiments. For example, within the scope of the present disclosure, all of the elements may be selectively coupled to one another in one or more of combinations. In addition, although all of the elements may be implemented as one independent hardware, some or all of the elements may be selectively combined to embody as a computer program including a program module performing a part or all of the functions in one or a plurality of hardware. The codes and code segments that comprise a computer program may be understood by those skilled in the art. Such a computer program may be stored in a non-transitory computer readable medium readable by a computer, readable and executed by a computer, thereby realizing an embodiment of the present disclosure.

At least part of devices (e.g., modules or functions thereof) or methods (e.g., operations) according to various embodiments may be stored as commands stored in a computer readable non-transitory computer readable media in the form of a program module. When the command is executed by a processor (e.g., the processor 130), the processor may perform a function corresponding to the command.

The program may be stored in a computer-readable non-transitory recording medium, read and executed by a computer, thereby implementing an embodiment of the present disclosure.

The non-transitory readable recording medium refers to a medium that semi-permanently stores data and is capable of being read by a device, but also includes a register, a cache, a buffer, etc.

For example, the above-described programs may be stored in a non-transitory readable recording medium such as a CD, a DVD, a hard disk, a Blu-ray disk, a USB, an internal memory (e.g., memory 150), a memory card, a ROM, a RAM, or the like.

Moreover, the method according to the disclosed embodiments may be provided as a computer program product.

The computer program product may include a software program, a computer-readable storage medium storing the software program, or a merchandise traded between a seller and a purchaser.

For example, a computer program product may be a product of a software program (e.g., a downloadable application) distributed electronically via an electronic device, a manufacturer of an electronic device or an electronic market (e.g., Google Play Store, App Store, etc.). For electronic distribution, at least a portion of the software program may be stored on a storage medium or may be created temporarily. In this case, the storage medium may be a storage medium of a server of a manufacturer or an electronic market, or a relay server.

Although example embodiments have been illustrated and described, it will be appreciated by those skilled in the art that changes may be made to these example embodiments without departing from the principles and spirit of the present disclosure. Accordingly, the scope of the present disclosure is not limited to the described example embodiments, but is defined, for example, by the appended claims and equivalents thereto.

What is claimed is:

1. A method for controlling an autonomous driving apparatus of a vehicle, the method comprising:
    receiving a destination for setting a driving route;
    obtaining driving history of a user and traffic information;
    determining a driving route to the destination based on input data comprising information regarding the destination, information regarding the driving history, and the traffic information, wherein the input data is provided to a neural network model trained based on an artificial intelligence algorithm;
    performing autonomous driving based on the determined driving route;
    based on a user input for changing the determined driving route being received while the vehicle drives based on the determined driving route, determining a new driving route to the destination by inputting the input data and information regarding a driving route change corresponding to the user input to the neural network; and
    performing autonomous driving based on the determined new driving route.

2. The method as claimed in claim 1, further comprising:
    updating the driving history of the user based on information regarding the changed driving route.

3. The method as claimed in claim 1, wherein determining a driving route comprises:
    obtaining at least one first driving route to the destination based on the destination information and the traffic information provided to a trained first model;
    obtaining a second driving route based on the destination information and the driving history of the user provided to a trained second model; and
    determining a driving route to the destination based on one of the at least one first driving route or the second driving route.

4. The method as claimed in claim 3, further comprising:
    displaying a user interface (UI) including a message that the determined driving route is not preferred by the user based on the determined driving route not being the second driving route.

5. The method as claimed in claim 3, wherein determining a driving route comprises:
    displaying a UI including information regarding the at least one first driving route and information regarding the second driving route; and
    determining one of the at least one first driving route or the second driving route as the driving route to the destination based on a user input received through the UI.

6. The method as claimed in claim 3, wherein the first driving route is one of: a minimum time driving route, a shortest distance driving route, or a least cost driving route from departure to the destination, and
    wherein the second driving route is a driving route preferred by the user.

7. The method as claimed in claim 1, wherein the driving history comprises: a preferred route of the user, a non-preferred route of the user, driving speed information of the vehicle, and lane change information.

8. The method as claimed in claim 7, further comprising:
    obtaining a driving habit of the user based on the driving history of the user provided to the model trained through the artificial intelligence algorithm,
    wherein the performing comprises performing autonomous driving based on the obtained driving habit.

9. An autonomous driving apparatus of a vehicle, comprising:
a communicator comprising circuitry;
a memory configured to store a driving history of a user; and
a processor configured to:
receive destination information and traffic information for setting a driving route, through the communicator,
determine a driving route to a destination based on input data comprising information regarding the destination, information regarding the driving history, and the traffic information, wherein the input data is provided to a neural network model trained based on an artificial intelligence algorithm,
perform autonomous driving based on the determined driving route;
based on a user input for changing the determined driving route being received while the vehicle drives based on the determined driving route, determine a new driving route to the destination by inputting the input data and information regarding a driving route change corresponding to the user input to the neural network model; and
perform autonomous driving based on the determined new driving route.

10. The apparatus as claimed in claim 9, wherein the processor is further configured to update the driving history of the user based on information regarding the changed driving route, and store the updated driving history in the memory.

11. The apparatus as claimed in claim 9, wherein the processor is further configured to:
obtain at least one first driving route to the destination based on the destination information and the traffic information provided to a trained first model,
obtain a second driving route based on the destination information and the driving history of the user provided to a trained second model, and
determine a driving route to the destination based on one of the at least one first driving route or the second driving route.

12. The apparatus as claimed in claim 11, further comprising:
a display,
wherein the processor is further configured to control the display to display a user interface (UI) including a message that the determined driving route is not preferred by the user based on the determined driving route not being the second driving route.

13. The apparatus as claimed in claim 11, further comprising:
a display,
wherein the processor is further configured to:
control the display to display a UI including information regarding the at least one first driving route and information regarding the second driving route, and
determine one of the at least one first driving route or the second driving route as the driving route to the destination based on a user input received through the UI.

14. The apparatus as claimed in claim 11, wherein the first driving route is one of: a minimum time driving route, a shortest distance driving route, or a least cost driving route from departure to the destination, and
wherein the second driving route is a driving route preferred by the user.

15. The apparatus as claimed in claim 9, wherein the driving history includes: a preferred route of the user, a non-preferred route of the user, driving speed information of the vehicle, and lane change information.

16. The apparatus as claimed in claim 15, wherein the processor is further configured to obtain a driving habit of the user based on the driving history of the user provided to the model trained through the artificial intelligence algorithm, and to perform autonomous driving based on the obtained driving habit.

* * * * *